United States Patent
Lim

(10) Patent No.: US 12,281,668 B2
(45) Date of Patent: Apr. 22, 2025

(54) BOLT FASTENING STRUCTURE AND ANTI-VIBRATION DEVICE INCLUDING THE SAME

(71) Applicant: GNI. Co., Ltd., Hwaseong-si (KR)

(72) Inventor: Chang Su Lim, Hwaseong-si (KR)

(73) Assignee: GNI CO., LTD (KR)

( * ) Notice: Subject to any disclaimer, the term of this patent is extended or adjusted under 35 U.S.C. 154(b) by 270 days.

(21) Appl. No.: 18/071,602

(22) Filed: Nov. 29, 2022

(65) Prior Publication Data

US 2023/0250844 A1    Aug. 10, 2023

(30) Foreign Application Priority Data

Feb. 9, 2022    (KR) ................ 10-2022-0016575

(51) Int. Cl.
| | | |
|---|---|---|
| *F16B 39/02* | (2006.01) | |
| *F16B 41/00* | (2006.01) | |
| *F16B 43/00* | (2006.01) | |
| *F16B 5/02*  | (2006.01) | |

(52) U.S. Cl.
CPC ............ *F16B 41/002* (2013.01); *F16B 43/00* (2013.01); *F16B 5/0241* (2013.01); *F16B 2200/20* (2018.08)

(58) Field of Classification Search
CPC .. F16B 2200/00; F16B 5/0241; F16B 41/002; F16B 2200/20
USPC ................................................ 411/107, 337
See application file for complete search history.

(56) References Cited

U.S. PATENT DOCUMENTS

| | | | | |
|---|---|---|---|---|
| 2,379,752 A * | 7/1945 | Schultz | ................... | F16B 35/06 |
| | | | | 411/401 |
| 2,467,877 A * | 4/1949 | Barry | ........................ | F16B 2/12 |
| | | | | 52/507 |
| 3,275,299 A * | 9/1966 | Meshew | ............... | B66F 19/005 |
| | | | | 254/131 |
| 3,456,412 A * | 7/1969 | Decombas | ............ | E04D 3/3605 |
| | | | | 52/549 |
| 4,226,058 A * | 10/1980 | Riley | .................... | E04D 3/3605 |
| | | | | 52/27 |
| 4,746,098 A * | 5/1988 | Abarotin | ............... | B66F 19/005 |
| | | | | 254/130 |
| 5,724,772 A * | 3/1998 | McGill | .................. | A47B 91/08 |
| | | | | 52/27 |
| 6,134,850 A * | 10/2000 | Hui | .......................... | E04B 5/43 |
| | | | | 248/680 |
| 10,689,841 B2 * | 6/2020 | Fugallo, III | .......... | E04B 1/4157 |

(Continued)

FOREIGN PATENT DOCUMENTS

KR        100730721 B1    6/2007

*Primary Examiner* — Gary W Estremsky
(74) *Attorney, Agent, or Firm* — Renaissance IP Law Group LLP

(57) ABSTRACT

Disclosed are a bolt fastening structure which is couplable and releasable at one side and includes a fall prevention washer capable of preventing a bolt from falling, and an anti-vibration device including the same. By using an L-shaped bolt having a bent portion, even without assistance from below a substructure such as a grating plate, an operator above the substructure can install an anti-vibration device on equipment alone. In addition, by using a fall prevention washer coupled to an L-shaped bolt, a bolt can be prevented from falling below a substructure when working on the substructure.

11 Claims, 7 Drawing Sheets

(56) References Cited

U.S. PATENT DOCUMENTS

| | | | | |
|---|---|---|---|---|
| 2013/0216324 A1* | 8/2013 | Tatina | ................... | B60P 3/075 410/3 |
| 2016/0017594 A1* | 1/2016 | Drummond | ........... | E04B 1/4121 52/699 |
| 2018/0371743 A1* | 12/2018 | Drummond | ............. | F16B 43/00 |
| 2020/0240293 A1* | 7/2020 | Cousins | ................ | F01D 25/243 |

* cited by examiner

BOLT FASTENING STRUCTURE AND ANTI-VIBRATION DEVICE INCLUDING THE SAME

CLAIM FOR PRIORITY

This application claims priority to Korean Patent Application No. 2022-0016575 filed on Feb. 9, 2022 in the Korean Intellectual Property Office (KIPO), the entire contents of which are hereby incorporated by reference.

BACKGROUND

1. Technical Field

The present disclosure relates to a bolt fastening structure and an anti-vibration device including the same, and more particularly, to a bolt fastening structure which is couplable and releasable at one side and includes a fall prevention washer capable of preventing a bolt from falling during work, and an anti-vibration device including the same.

2. Related Art

In general, in an industrial plant, vibrations may be generated from various vibration generation sources because various pieces of equipment are operating. In an industrial plant that includes many micro-processes such as semiconductor manufacturing processes, even minute vibrations may have a big impact on products. Therefore, recently, an anti-vibration device has been installed on each piece of equipment. A general anti-vibration device is applied as an element interposed between a supporting structure and the equipment.

However, there is a difficulty in that a supporting structure such as a grating should be lifted in order to fixedly install an additional device or element such as an anti-vibration device on the supporting structure on a piece of equipment which is running. In order to fixedly install an additional device, bolts/nuts should be fastened, and for the bolt/nut fastening, after a substructure is lifted, a bracket or the like should be first coupled. However, as described above, lifting a substructure is not an easy task because there are many different types of devices in an industrial plant. Recently, in order to control even minute vibrations applied in an industrial plant, anti-vibration devices for blocking vibration have been installed below each piece of equipment. The installed anti-vibration devices are usually disposed below four corners of equipment to block vibrations while supporting the equipment.

In this case, each anti-vibration device should be fixed to a substructure from above the substructure without lifting a grating that is the substructure, and thus there is a need for a special fastening structure in order to prevent a bolt from falling below the substructure when the anti-vibration device is fixed to the substructure using the bolt from above the substructure.

RELATED ART DOCUMENTS

Patent Documents (Patent Document 1) Korean Patent Registration No. 10-0730721

SUMMARY

Accordingly, example embodiments of the present inventive concept are provided to substantially obviate one or more problems due to limitations and disadvantages of the related art.

Example embodiments of the present inventive concept provide a bolt fastening structure which allows an anti-vibration device to be installed on a substructure and is capable of preventing a bolt used in installing the anti-vibration device from falling below the substructure, and an anti-vibration device including the same.

In some example embodiments, a bolt fastening structure includes an L-shaped bolt which is inserted into a hole of a substructure and includes an upper vertical portion having a thread groove and a lower horizontal portion extending from a lower end of the upper vertical portion, wherein the substructure is positioned below equipment of an industrial plant and has the hole for fastening formed therein, and a fall prevention washer which is fastened to the L-shaped bolt in a ring shape and is fastened to the hole of the substructure to prevent the L-shaped bolt from falling below the substructure.

The fall prevention washer may include an insertion portion inserted into the hole of the substructure, and a locking portion which is formed to extend upward from the insertion portion and in which the L-shaped bolt is insertion-coupled to a central portion thereof.

The locking portion may include an edge portion supported on an upper surface of the substructure, a fixing ring which is disposed inside the edge portion to be spaced from the edge portion and allows the L-shaped bolt to be inserted and fixed, and a connection portion configured to connect the fixing ring and the edge portion.

An outer diameter of the edge portion may be greater than an outer diameter of the hole of the substructure.

The fixing ring may be divided into a semicircular shape, and each portion of the divided fixing ring may be connected to the edge portion through the connection portion.

The fixing ring may have a shape in which one side of a circle is divided, and a side opposite to the divided one side may be connected to the edge portion through the connection portion.

When the fall prevention washer is fastened to the L-shaped bolt, the fixing ring may be disposed to be coupled to the thread groove formed on the L-shaped bolt.

In a state in which the fall prevention washer is fastened to the L-shaped bolt, when an end portion of the lower horizontal portion is inserted into the hole of the substructure from above the substructure, the upper vertical portion may be upright, and concurrently, the fall prevention washer may be inserted into the hole of the substructure so that the L-shaped bolt may be prevented from falling below the substructure.

In other example embodiments, an anti-vibration device includes at least one buffer pad disposed on a substructure in which a hole for fastening is formed, a bracket member in which one portion thereof overlaps the at least one buffer pad, and the other portion thereof is a portion for connection with equipment disposed on the substructure, a cover plate disposed on an overlapping body of the at least one buffer pad and the bracket member, and a fixing unit which is coupled to the substructure by passing through the at least one buffer pad, the bracket member, and the cover plate and is fastened to the hole of the substructure.

The fixing unit may include an L-shaped bolt which is inserted into the hole of the substructure and includes an upper vertical portion having a thread groove and a lower horizontal portion extending from a lower end of the upper vertical portion, a fall prevention washer which is fastened to the L-shaped bolt in a ring shape and is fastened to the hole of the substructure to prevent the L-shaped bolt from falling below the substructure, and a nut fastened to the upper vertical portion on the cover plate in a state in which the fall prevention washer is fastened to the hole of the substructure, and the upper vertical portion passes through a fastening hole formed by arranging bolt holes formed in the at least one buffer pad, the bracket member, and the cover plate to overlap the hole of the substructure.

The fall prevention washer may include an insertion portion inserted into the hole of the substructure, and a locking portion which is formed to extend upward from the insertion portion and in which the L-shaped bolt is insertion-coupled to a central portion thereof.

The locking portion may include a fixing ring into which the L-type bolt is inserted and which presses and fixes the inserted L-type bolt, an edge portion spaced apart from the fixing ring and supported on an upper surface of the substructure, and a connection portion configured to connect the fixing ring and the edge portion.

An outer diameter of the edge portion may be greater than an outer diameter of the hole of the substructure.

The at least one buffer pad may be disposed in contact with both an upper surface of the fall prevention washer fastened to the hole of the substructure and an upper surface of the substructure.

BRIEF DESCRIPTION OF DRAWINGS

Example embodiments of the present inventive concept will become more apparent by describing in detail example embodiments of the present inventive concept with reference to the accompanying drawings, in which.

DESCRIPTION OF EXAMPLE EMBODIMENTS

Figure 1:
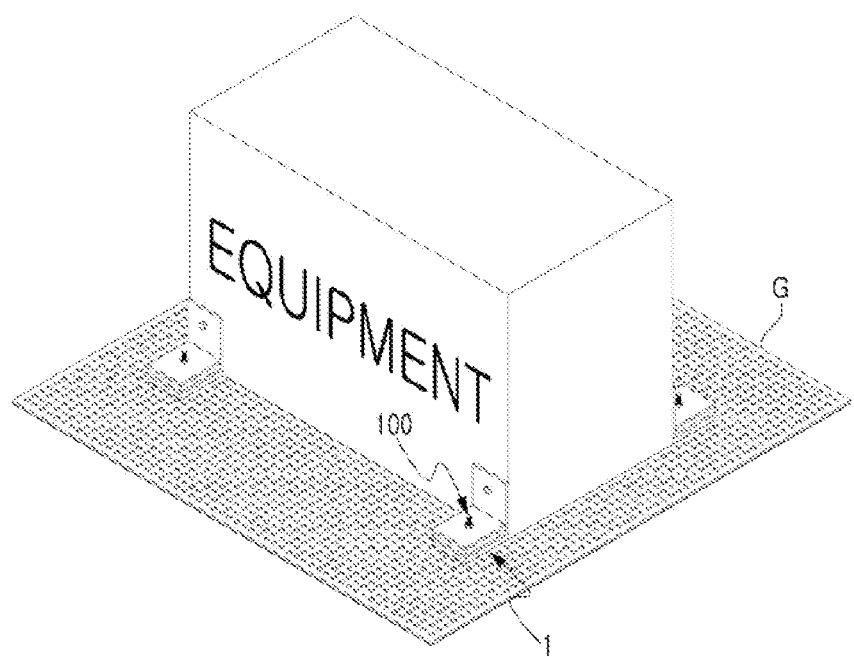
FIG. 1 is a view illustrating that an anti-vibration device of the present inventive concept is installed on a substructure to support a piece of equipment.

The present inventive concept can be modified into various forms and can have various example embodiments. Specific example embodiments will be shown in the accompanying drawings and described in detail. However, it is not intended that the present inventive concept is limited to the specific example embodiments, and it is interpreted that all the modifications, equivalents, and substitutions belonging to the concept and technical scope of the present inventive concept are included in the present inventive concept. In describing the present inventive concept, when it is determined that detailed descriptions of known techniques involved in the present inventive concept may obscure the gist of the present inventive concept, the detailed descriptions thereof will be omitted.

Hereinafter, example embodiments according to the present inventive concept will be described in detail with reference to the accompanying drawings, and in describing the example embodiments with reference to the accompanying drawings, the same or corresponding components are assigned the same reference numerals, and redundant descriptions thereof will be omitted.

FIG. 1 is a view illustrating that an anti-vibration device of the present inventive concept is installed on a substructure to support a piece of equipment.

Figure 2:
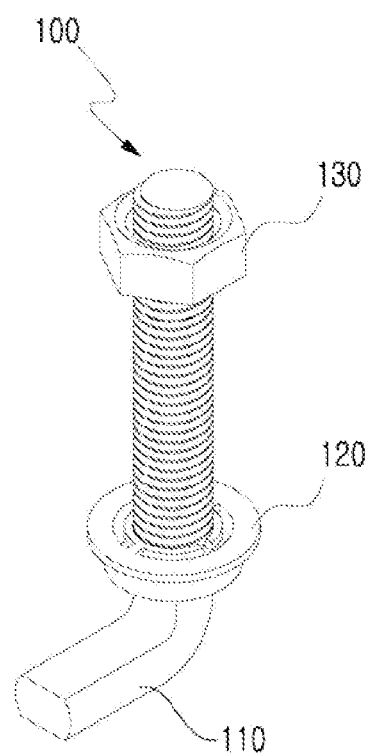
FIG. 2 is a view illustrating a fixing unit of the present inventive concept.

FIG. 2 is a view illustrating a fixing unit of the present inventive concept.

Figure 3:
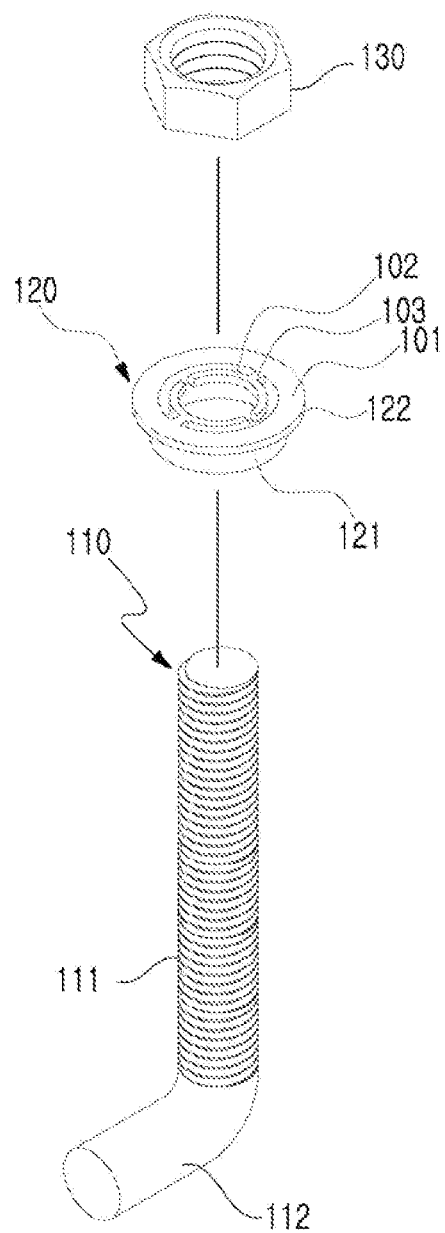
FIG. 3 is an exploded view of the fixing unit of FIG. 2.

FIG. 3 is an exploded view of the fixing unit of FIG. 2.

Referring to FIGS. 1 to 3, an anti-vibration device 1 of the present inventive concept is installed under a piece of equipment in an industrial plant and is used to block external vibrations from being transmitted to the piece of equipment or block vibrations of the piece of equipment from being transmitted to the outside. That is, as shown in FIG. 1, in an industrial plant, equipment is usually disposed on a substructure G such as a grating in which a number of holes are formed. Since the substructure G is installed at a height of several meters, the equipment placed thereon is also disposed at a height of several meters from a ground surface. Pipes or wires for the equipment are disposed below the substructure G. As described above, the grating, that is, the substructure G, supports the equipment after being installed, but since the grating is installed at a height of several meters, in order to prevent accidents, the grating is restrained from being lifted or repositioned as much as possible. After all, in order to install an element disposed below the equipment, such as the anti-vibration device 1 of the present inventive concept, it is preferable that the element be fixed to the substructure G by an operator from above the substructure G.

Therefore, the present inventive concept provides a bolting fastening structure in which the anti-vibration device 1 can be fixedly installed to the substructure G from above in a state in which the substructure G is left as it is.

An example of a fixing unit 100 included in the bolt fastening structure according to the present inventive concept is applied in FIGS. 1 to 7. As in FIGS. 2 and 3, the fixing unit 100 includes an L-shaped bolt 110 having a "¬" shape, a fall prevention washer 120, and a fixing nut 130. The bolt fastening structure is a component in which the fixing unit 100 is inserted into a fastening hole formed in objects to be coupled to couple the objects to be coupled. Here, the objects to be coupled may be, for example, the anti-vibration device 1 and the substructure (grating) G. The fastening hole is a hole formed by arranging bolt holes, into which the L-shaped bolt 110 may be inserted therein, formed in components of the anti-vibration device 1, to overlap a hole, into which the L-shaped bolt 110 may be inserted, formed in the substructure G. As a result, the L-shaped bolt 110 is inserted into the fastening hole to couple the substructure G and the anti-vibration device 1.

The L-shaped bolt 110 according to the present inventive concept has the "¬" shape and includes an upper vertical portion 111 and a lower horizontal portion 112. The lower horizontal portion 112 may have a shape extending from a lower end of the upper vertical portion 111.

The lower horizontal portion 112 may be a portion that is inserted into the hole of the substructure G at the time of coupling and is positioned below the substructure G and compressed on a lower surface of the substructure G. The upper vertical portion 111 is a portion that passes through the substructure G and the fastening hole formed in the components of the anti-vibration device 1 placed on the substructure G, a thread groove is formed thereon, and the fixing nut 130 is coupled thereto.

When the fixing nut 130 is tightened, the fixing nut 130 approaches the lower horizontal portion 112 of the L-shaped bolt 110 to press and couple objects to be coupled, that is, the components of the anti-vibration device 1 and the substructure G.

The L-shaped bolt 110 may have a shape in which at least an upper surface of the lower horizontal portion 112 of the L-shaped bolt 110 in contact with the lower surface of the substructure G is cut into a planar surface. Since the cut planar surface does not have a thread groove, when the lower horizontal portion 112 of the L-shaped bolt 110 is inserted into the hole of the substructure G, a problem that the lower horizontal portion 112 is caught on an edge of the hole may not occur, and when the fixing nut 130 is fastened, the upper surface of the lower horizontal portion 112 may be more firmly in contact with the lower surface of the substructure G.

The fall prevention washer 120 is fastened to the L-shaped bolt 110 to prevent the L-shaped bolt 110 inserted into the hole of the substructure G from falling below the substructure G. That is, the fall prevention washer 120 is fixedly fastened to the L-shaped bolt 110. When the lower horizontal portion 112 of the L-shaped bolt 110 is inserted into the hole of the substructure G, the fall prevention washer 120 may be fastened to the hole of the substructure G. Since the fall prevention washer 120 is simultaneously fastened to the L-shaped bolt 110 and inserted and fixed to the hole of the substructure G, the fall prevention washer 120 can prevent the L-shaped bolt 110 from falling below the substructure G.

In addition, the fall prevention washer 120 may have a ring shape and may include an insertion portion 121 inserted into the hole of the substructure G and a locking portion 122 formed to extend upward from the insertion portion 121.

The insertion portion 121 may be a portion that is inserted into the hole of the substructure G. Therefore, the insertion portion 121 is preferably formed to have a size that is less than or equal to a size of the hole of the substructure G.

The locking portion 122 may be formed to extend from the insertion portion 121 and may be formed to have a size that is greater than a diameter of the insertion portion 121. That is, it is preferable that the locking portion 122 has a diameter that is greater than a size of the hole of the substructure G. In addition, the locking portion 122 may include an edge portion 101, a fixing ring 102, and a connection portion 103.

The edge portion 101 may be positioned at the edge of the locking portion 122 and may have, for example, a ring shape. A diameter of the edge portion 101 may be greater than a size of the hole of the substructure G so that when the fall prevention washer 120 is inserted into the hole of the substructure G, the edge portion 101 may be caught on an upper surface of the substructure G. That is, since the edge portion 101 may be supported on the upper surface of the substructure G, even if the insertion portion 121 is inserted into the hole of the substructure G, the fall prevention washer 120 may be fastened to the hole of the substructure G so as to not fall below the substructure G.

The fixing ring 102 may have a thin ring shape and may be disposed to be spaced apart from the edge portion 101 inside the edge portion 101. The L-shaped bolt 110 may be inserted into the fixing ring 102, and the inserted L-shaped bolt 110 may be fixed in a state of being inserted into the fixing ring 102. Accordingly, a size of an inner hole of the fixing ring 102 into which the L-shaped bolt 110 is inserted may be less than or equal to a diameter of the L-shaped bolt 110.

In addition, the fixing ring 102 may have a ring shape and may be formed to be divided into a semicircular shape. That is, as shown in FIG. 3, portions of the fixing ring 102 divided into the semicircular shape may be spaced a certain distance from each other and positioned inside the edge portion 101. As an example, the L-shaped bolt 110 may be inserted between the portions of the fixing ring 102 divided into the semicircular shape. In this case, the fixing ring 102 may be coupled to a thread groove formed on the upper vertical portion 111 of the L-shaped bolt 110. That is, when the upper vertical portion 111 of the L-shaped bolt 110 is inserted into the fixing ring 102, the fixing ring 102 may be inserted into the thread groove formed on the vertical portion 111, and thus the L-shaped bolt 110 may be fixed to the fall prevention washer 120.

The fixing ring 102 may be connected to the edge portion 101 through the connection portion 103. That is, each portion of the fixing ring 102 divided into the semicircular shape may be connected to the edge portion 101 through the connection portion 103. As an example, the edge portion 101, the fixing ring 102, and the connection portion 103 connected to each other may be integrally formed. Here, the fixing ring 102 may be disposed inside the edge portion 101 to be spaced a certain distance from the edge portion 101, and since the fixing ring 102 is connected to the edge portion 101 through the connection portion 103, the fixing ring 102 may have certain flexibility in an upper or lower direction with respect to the edge portion 101.

As an example, the upper vertical portion 111 of the L-shaped bolt 110 may be inserted upward from below the fixing ring 102. In this case, even when an inner diameter of the fixing ring 102 is less than or equal to an outer diameter of the L-shaped bolt 110, the L-shaped bolt 110 may be inserted into the fixing ring 102 due to the flexibility of the connection portion 103. In addition, when the fixing ring 102 is inserted into the thread groove of the L-shaped bolt 110, the connection portion 103 may support the fixing ring 102 to not move, and thus the fixing ring 102 may be stably fastened to the L-shaped bolt 110.

Figure 4:
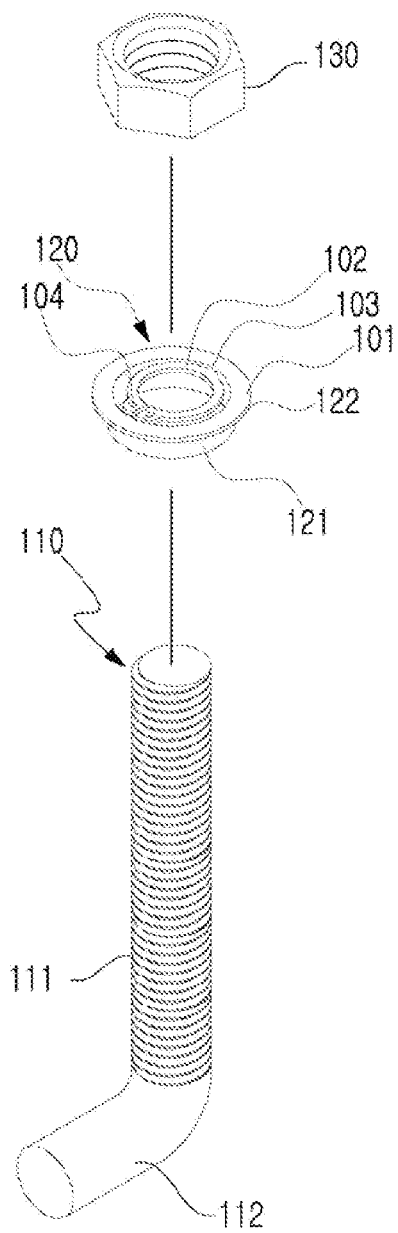
FIG. 4 is a view illustrating a fixing unit according to another example embodiment of the present inventive concept.

FIG. 4 is a view illustrating a fixing unit according to another example embodiment of the present inventive concept.

Referring to FIG. 4, in a fixing unit 100 according to another example embodiment of the present inventive concept, an L-shaped bolt 110 and a fixing nut 130 may have the same configurations as those of FIG. 2, and only one side of a fixing ring 102 of a fall prevention washer 120 may have a shape that is divided. Accordingly, a connection portion 103 may be connected to the fixing ring 102 and an edge portion 101 and may be connected only to a side opposite to the divided one side of the fixing ring 102.

That is, since the connection portion 103 is connected only to one side of the fixing ring 102, when the L-shaped bolt 110 is inserted into the fixing ring 102, the L-shaped bolt 110 may be more flexibly inserted into the fixing ring 102. In addition, an end portion of a divided portion of the fixing ring 102 may be formed to protrude, and a gap hole 104 may be formed in a formed protrusion. That is, by spreading the divided fixing ring 102 to both sides using a spreading tool or the like in the gap hole 104, the L-shaped bolt 110 may be more stably inserted when inserted into the fixing ring 102. After the L-shaped bolt 110 is inserted into the fixing ring 102, the spreading tool may be removed from the gap hole 104 to fix the L-shaped bolt 110 to the fixing ring 102.

In an example of the fixing unit 100 of the bolt fastening structure of the present inventive concept, even in a state in which the substructure G such as a grating is not changed through lifting or the like, the anti-vibration device 1 can be fixedly installed to the substructure G from above.

In addition, the L-shaped bolt 110 may be inserted into the hole of the substructure G in a state of being coupled to the fall prevention washer 120. That is, when the lower horizontal portion 112 of the L-shaped bolt 110 is inserted into the hole of the substructure G, the insertion portion 121 of the fall prevention washer 120 may also be inserted into the hole of the substructure G. In this case, since the locking portion 122 of the fall prevention washer 120 is caught on the upper surface of the substructure G, it is possible to prevent the L-shaped bolt 110 from falling below the substructure G.

Hereinafter, an anti-vibration device including the above-described bolt fastening structure will be described in detail.

Figure 5:
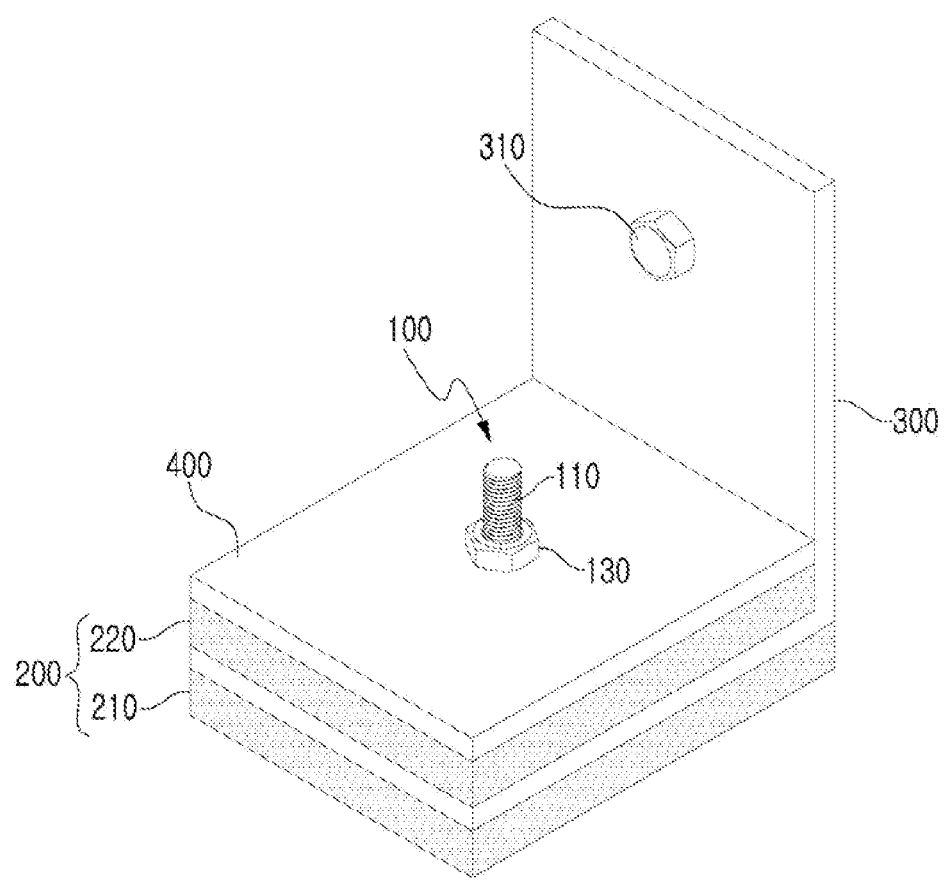
FIGS. 5 and 6 are views illustrating an example of an anti-vibration device according to the present inventive concept.
Figure 6:
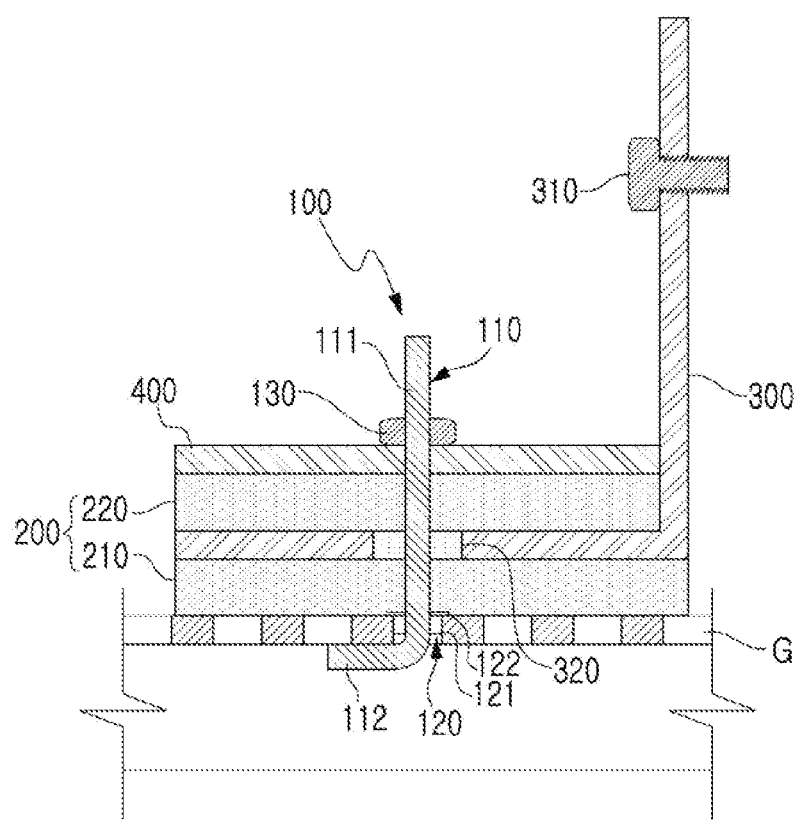

FIGS. 5 and 6 are views illustrating an example of an anti-vibration device according to the present inventive concept.

Figure 7:
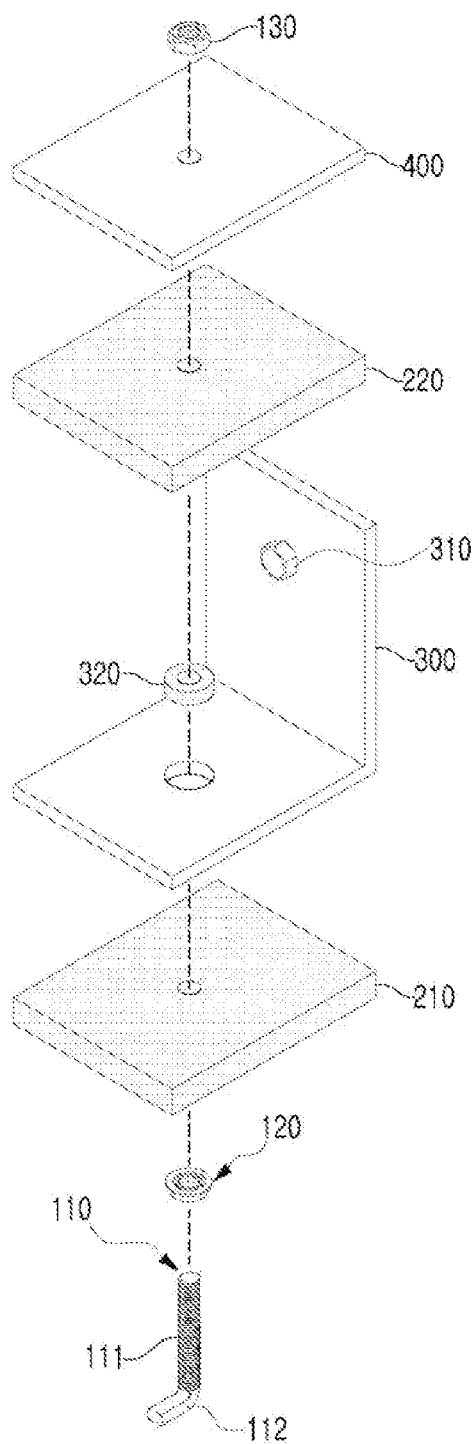
FIG. 7 is an exploded view of the anti-vibration device of FIG. 5.

FIG. 7 is an exploded view of the anti-vibration device of FIG. 5.

Referring to FIGS. 5 to 7, an anti-vibration device 1 according to the present inventive concept includes at least one buffer pad 200, a bracket member 300 in which one portion thereof overlaps the buffer pad 200 and the other portion thereof is coupled to a piece of equipment, a cover plate 400, and a fixing unit 100.

When the at least one buffer pad 200 is provided as a plurality of buffer pads 200 in the illustrated example, a portion of the bracket member 300 may be stacked in a form interposed between the buffer pads 200. As an example, the buffer pads 200 may include a first buffer pad 210 disposed on a substructure G and disposed between the substructure G and the bracket member 300 and a second buffer pad 220 disposed between the bracket member 300 and the cover plate 400. The buffer pad 200 may be formed of an elastic rubber material to absorb vibrations transmitted through the substructure G.

One portion of the bracket member 300 may be disposed to overlap the buffer pad 200, and the other portion thereof may be disposed to be connected to the equipment disposed on the substructure G. That is, the equipment disposed on the substructure G may be disposed to be fixed to the substructure G through the bracket member 300. As an example, the bracket member 300 may have a "¬" shape such that a portion thereof overlaps the buffer pad 200 disposed on the substructure G, and the other portion thereof is fixed in contact with a side surface of the equipment using a bolt 310.

The cover plate 400 may be disposed on an overlapping body of at least one buffer pad 200 and the bracket member 300. As an example, the first buffer pad 210, the bracket member 300, the second buffer pad 220, and the cover plate 400 may be sequentially stacked on the substructure G. In this case, the cover plate 400 may be formed to cover the entirety of an upper surface of the second buffer pad 220. As an example, when the at least one buffer pad 200, the bracket member 300, and the cover plate 400 are fixed to the substructure G using the fixing unit 100 which will be described below, the cover plate 400 may press and fix the at least one buffer pad 200 and the bracket member 300 toward the substructure G.

Components of the anti-vibration device 1 each include a bolt hole through which the L-shaped bolt 110 of the fixing unit 100 passes, and the bolt holes are disposed to be aligned with a hole of the substructure G to constitute a fastening hole. The L-shaped bolt 110 of the fixing unit 100 is inserted into the fastening hole.

As an example of an installation process, first, the fall prevention washer 120 is fastened to the L-shaped bolt 110. In this case, the L-shaped bolt 110 may be inserted through a fixing ring 102 of the fall prevention washer 120 and may be fastened such that the fixing ring 102 is fixedly fastened to a lower portion of a thread groove of the L-shaped bolt 110.

The L-shaped bolt 110 to which the fall prevention washer 120 is coupled is inserted into the hole of the substructure G. As an example, when a lower horizontal portion 112 of the L-shaped bolt 110 is inserted into the hole of the substructure G, since the fall prevention washer 120 is fixedly inserted into the hole of the substructure G, the L-shaped bolt 110 coupled to the fall prevention washer 120 may be fixed upright to the substructure G without falling below the substructure G.

After the L-shaped bolt 110 is fixed to the substructure G, the first buffer pad 210 may be fitted onto the L-shaped bolt 110 so as to be in contact with an upper surface of the substructure G and an upper surface of the fall prevention washer 120. In this case, due to an elastic rubber material of the first buffer pad 210, a bottom surface of the first buffer pad 210 may be disposed in contact with both the upper surface of the substructure G and the upper surface of the fall prevention washer 120.

The bracket member 300 may be fitted onto the L-shaped bolt 110 and stacked on the first buffer pad 210. Meanwhile, a packing 320 may be disposed in the fastening hole, into which the L-shaped bolt 110 is inserted, in the bracket member 300. The packing 320 may be formed of, for example, an elastic rubber material so as to absorb vibrations transmitted through the L-shaped bolt 110. That is, vibrations generated in the substructure G may be transmitted to the bracket member 300 through the L-shaped bolt 110 due to the contact between metals of the bracket member 300 and the L-shaped bolt 110 which are formed of metal materials. Therefore, the packing 320 formed of an elastic rubber material is inserted in an area in which the L-shaped bolt 110 and the bracket member 300 are in contact with each other, thereby blocking the vibrations transmitted through the L-shaped bolt 110.

The second buffer pad 220 and the cover plate 400 may be sequentially fitted onto the L-shaped bolt 110 and stacked on the bracket member 300. After the first buffer pad 210, the bracket member 300, the second buffer pad 220, and the cover plate 400 are stacked on the L-shaped bolt 110, a fixing nut 130 is fastened to the L-shaped bolt 110. That is, the fixing nut 130 is inserted into the thread groove of the L-shaped bolt 110 exposed above the cover plate 400, and the fixing nut 130 is fastened in contact with the cover plate 400. In this case, by firmly fastening the fixing nut 130, the lower horizontal portion 112 of the L-shaped bolt 110 may be strongly pulled toward the substructure G and compressed on a lower surface of the substructure G to firmly fix the anti-vibration device 1. Then, the bolt 310 of the bracket member 300 is coupled to the equipment, and thus the anti-vibration device 1 may be installed to support the equipment.

As described above, the anti-vibration device 1 of the present inventive concept can be installed using the fixing unit 100 without lifting the substructure G such as a steel grating. For example, the L-shaped bolt 110 of the fixing unit 100 is temporarily fixed to the substructure G from above the substructure G in a state in which the substructure G is left as it is. The L-shaped bolt 110 is temporarily fixed naturally while the fall prevention washer 120 coupled to the L-shaped bolt 110 is fixedly inserted into the hole of the substructure G. In a state in which the L-shaped bolt 110 is temporarily fixed, components of the anti-vibration device 1 are fitted onto the L-shaped bolt 110 and coupled. That is, it is possible to install the anti-vibration device 1 from above the substructure G.

In addition, when the anti-vibration device 1 is mounted from above the substructure G using the L-shaped bolt 110, the L-shaped bolt 110 can be prevented from falling below the substructure G by the fall prevention washer 120.

The bolt fastening structure and anti-vibration device 1 of the present inventive concept are installed on equipment of a production plant, in which precision processes are required as in semiconductors, and blocks the transmission of vibrations, thereby significantly increasing a production yield. In particular, the bolt fastening structure of the present inventive concept enables equipment, which are pre-installed and are running, to be easily installed.

According to the present inventive concept, by using an L-shaped bolt having a bent portion, even without assistance from below a substructure such as a grating plate, an operator above the substructure can install an anti-vibration device on equipment alone.

In addition, by using a fall prevention washer coupled to an L-shaped bolt, a bolt can be prevented from falling below a substructure when working on the substructure.

Effects of the present inventive concept are not limited to the above-described effects and other effects which are not described may be clearly understood by those skilled in the art from the following descriptions.

Meanwhile, example embodiments of the present inventive concept shown in the present specification and drawings are for enhancing understanding and are not intended to limit the scope of the present inventive concept. It is clear to a person with ordinary knowledge in the art to which the present inventive concept belongs that other modified example embodiments based on the technical concepts of the present inventive concept are possible in addition to the disclosed example embodiments.

What is claimed is:

1. A bolt fastening structure comprising:
an L-shaped bolt which is inserted into a hole of a substructure and includes an upper vertical portion having a thread groove and a lower horizontal portion extending from a lower end of the upper vertical portion, wherein the substructure is positioned below equipment of an industrial plant and has the hole for fastening formed therein; and
a fall prevention washer which is fastened to the L-shaped bolt in a ring shape and is fastened to the hole of the substructure to prevent the L-shaped bolt from falling below the substructure, wherein the fall prevention washer includes:
an insertion portion inserted into the hole of the substructure; and
a locking portion which is formed to extend upward from the insertion portion and in which the L-shaped bolt is insertion-coupled to a central portion thereof.

2. The bolt fastening structure of claim 1, wherein the locking portion includes:
an edge portion supported on an upper surface of the substructure;
a fixing ring which is disposed inside the edge portion to be spaced apart from the edge portion and allows the L-shaped bolt to be inserted and fixed; and
a connection portion configured to connect the fixing ring and the edge portion.

3. The bolt fastening structure of claim 2, wherein an outer diameter of the edge portion is greater than an outer diameter of the hole of the substructure.

4. The bolt fastening structure of claim 2, wherein:
the fixing ring is divided into a semicircular shape; and
each portion of the divided fixing ring is connected to the edge portion through the connection portion.

5. The bolt fastening structure of claim 2, wherein:
the fixing ring has a shape in which one side of a circle is divided; and
a side opposite to the divided one side is connected to the edge portion through the connection portion.

6. The bolt fastening structure of claim 2, wherein, when the fall prevention washer is fastened to the L-shaped bolt, the fixing ring is disposed to be coupled to the thread groove formed on the L-shaped bolt.

7. The bolt fastening structure of claim 1, wherein, in a state in which the fall prevention washer is fastened to the L-shaped bolt, when an end portion of the lower horizontal portion is inserted into the hole of the substructure from above the substructure, the upper vertical portion is upright, and concurrently, the fall prevention washer is inserted into the hole of the substructure so that the L-shaped bolt is prevented from falling below the substructure.

8. An anti-vibration device comprising:
at least one buffer pad disposed on a substructure in which a hole for fastening is formed;
a bracket member in which one portion thereof overlaps the at least one buffer pad, and the other portion thereof is a portion for connection with equipment disposed on the substructure;
a cover plate disposed on an overlapping body of the at least one buffer pad and the bracket member; and
a fixing unit which is coupled to the substructure by passing through the at least one buffer pad, the bracket member, and the cover plate and is fastened to the hole of the substructure, wherein the fixing unit includes:
an L-shaped bolt which is inserted into the hole of the substructure and includes an upper vertical portion having a thread groove and a lower horizontal portion extending from a lower end of the upper vertical portion;
a fall prevention washer which is fastened to the L-shaped bolt in a ring shape and is fastened to the hole of the substructure to prevent the L-shaped bolt from falling below the substructure, wherein the fall prevention washer includes:
an insertion portion inserted into the hole of the substructure; and
a locking portion which is formed to extend upward from the insertion portion and in which the L-shaped bolt is insertion-coupled to a central portion thereof; and
a nut fastened to the upper vertical portion on the cover plate in a state in which the fall prevention washer is fastened to the hole of the substructure, and the upper vertical portion passes through a fastening hole formed by arranging bolt holes formed in the at least one buffer pad, the bracket member, and the cover plate to overlap the hole of the substructure.

9. The anti-vibration device of claim 8, wherein the locking portion includes:
a fixing ring into which the L-type bolt is inserted and which presses and fixes the inserted L-type bolt;

an edge portion spaced apart from the fixing ring and supported on an upper surface of the substructure; and
a connection portion configured to connect the fixing ring and the edge portion.

10. The anti-vibration device of claim 9, wherein an outer diameter of the edge portion is greater than an outer diameter of the hole of the substructure.

11. The anti-vibration device of claim 8, wherein the at least one buffer pad is disposed in contact with both an upper surface of the fall prevention washer fastened to the hole of the substructure and an upper surface of the substructure.

\* \* \* \* \*